(12) United States Patent
Warner

(10) Patent No.: US 7,434,388 B2
(45) Date of Patent: Oct. 14, 2008

(54) METHOD AND SYSTEM FOR REGENERATION OF A PARTICULATE FILTER

(75) Inventor: Oliver A. Warner, Brighton, MI (US)

(73) Assignee: Detroit Diesel Corporation, Detroit, MI (US)

( * ) Notice: Subject to any disclaimer, the term of this patent is extended or adjusted under 35 U.S.C. 154(b) by 245 days.

(21) Appl. No.: 11/020,837

(22) Filed: Dec. 22, 2004

(65) Prior Publication Data

US 2006/0130460 A1    Jun. 22, 2006

(51) Int. Cl.
*F01N 3/00* (2006.01)
(52) U.S. Cl. .............................. 60/295; 60/274; 60/286; 60/297; 60/311
(58) Field of Classification Search ............. 60/274, 60/285, 286, 295, 297, 311, 303
See application file for complete search history.

(56) References Cited

U.S. PATENT DOCUMENTS

| | | | |
|---|---|---|---|
| 4,395,875 A | 8/1983 | Virk | |
| 4,677,823 A | 7/1987 | Hardy | |
| 4,719,751 A | 1/1988 | Kume et al. | |
| 4,730,455 A | 3/1988 | Pischinger et al. | |
| 4,747,264 A | 5/1988 | Santiago et al. | |
| 4,897,096 A | 1/1990 | Pischinger et al. | |
| 5,028,405 A | 7/1991 | Erdmannsdoerfer et al. | |
| 5,042,248 A | 8/1991 | Abthoff et al. | |
| 5,044,158 A | 9/1991 | Goerlich | |
| 5,557,923 A | 9/1996 | Bolt et al. | |
| 5,826,425 A | 10/1998 | Sebastiano et al. | |
| 5,956,944 A | 9/1999 | Dementhon et al. | |
| 6,176,896 B1 | 1/2001 | Dementhon et al. | |
| 6,304,815 B1 | 10/2001 | Moraal et al. | |
| 6,347,513 B2 | 2/2002 | Pfleger et al. | |
| 6,349,707 B1 | 2/2002 | Neumann et al. | |
| 6,374,812 B1 | 4/2002 | Wiese | |
| 6,397,584 B2 | 6/2002 | Salvat et al. | |
| 6,574,956 B1 | 6/2003 | Moraal et al. | |
| 6,615,577 B2 | 9/2003 | Meyer et al. | |
| 6,615,580 B1 | 9/2003 | Khair et al. | |
| 6,622,480 B2 | 9/2003 | Tashiro et al. | |
| 6,632,764 B2 | 10/2003 | Druckhammer et al. | |
| 6,666,020 B2 | 12/2003 | Tonetti et al. | |
| 6,698,192 B2 | 3/2004 | Ootake | |
| 6,708,487 B2 | 3/2004 | Morimoto et al. | |
| 6,718,755 B2 * | 4/2004 | Brehob ....................... 60/284 |
| 6,722,120 B2 | 4/2004 | Plote | |
| 6,735,941 B2 | 5/2004 | Saito et al. | |
| 6,742,328 B2 | 6/2004 | Webb et al. | |

(Continued)

FOREIGN PATENT DOCUMENTS

DE        43 27 086 C1      2/1995

(Continued)

*Primary Examiner*—Thomas Denion
*Assistant Examiner*—Diem Tran
(74) *Attorney, Agent, or Firm*—Brooks Kushman P.C.

(57) ABSTRACT

Method, system, and controller for regeneration a particulate filter as a function of fuels emitted with exhaust gases from an engine to an oxidation catalyst. The method, system, and controller being applicable in systems having an engine which emits exhaust gases having particulates that are captured by the particulate filter.

11 Claims, 1 Drawing Sheet

U.S. PATENT DOCUMENTS

| | | | |
|---|---|---|---|
| 6,742,331 | B2 | 6/2004 | Minami |
| 6,756,904 | B2 | 6/2004 | Kinugawa et al. |
| 6,758,039 | B2 | 7/2004 | Kuboshima et al. |
| 6,769,246 | B2 | 8/2004 | Strohmaier et al. |
| 6,826,905 | B2 * | 12/2004 | Gui et al. .................. 60/295 |
| 6,904,752 | B2 * | 6/2005 | Foster et al. .................. 60/295 |
| 6,948,311 | B2 * | 9/2005 | Schaller et al. .............. 60/286 |
| 7,153,342 | B2 * | 12/2006 | Koga et al. .................. 95/20 |
| 7,201,121 | B2 * | 4/2007 | Weber et al. ............. 123/90.12 |
| 2001/0010152 | A1 | 8/2001 | Tallec et al. |
| 2002/0033017 | A1 | 3/2002 | Bruggemann et al. |
| 2002/0112472 | A1 | 8/2002 | Tashiro et al. |
| 2002/0128146 | A1 | 9/2002 | Druckhammer et al. |
| 2002/0157383 | A1 | 10/2002 | Bouchez et al. |
| 2002/0178922 | A1 | 12/2002 | Ohno et al. |
| 2002/0189235 | A1 | 12/2002 | Meyer et al. |
| 2002/0194843 | A1 | 12/2002 | Ootake |
| 2003/0029427 | A1 | 2/2003 | Esteghlal |
| 2003/0033800 | A1 | 2/2003 | Tonetti et al. |
| 2003/0089102 | A1 | 5/2003 | Colignon et al. |
| 2003/0089103 | A1 | 5/2003 | Hahn et al. |
| 2003/0106303 | A1 | 6/2003 | Plote |
| 2003/0106308 | A1 | 6/2003 | Gabe et al. |
| 2003/0115858 | A1 | 6/2003 | Hahn et al. |
| 2003/0121249 | A1 | 7/2003 | Foster et al. |
| 2003/0124031 | A1 | 7/2003 | Dionnet et al. |
| 2003/0126858 | A1 | 7/2003 | Strohmaier et al. |
| 2003/0136117 | A1 | 7/2003 | Megas |
| 2003/0140623 | A1 | 7/2003 | Ootake |
| 2003/0145581 | A1 | 8/2003 | Tashiro et al. |
| 2003/0145582 | A1 | 8/2003 | Bunting et al. |
| 2003/0182936 | A1 | 10/2003 | Kitahara |
| 2003/0188518 | A1 | 10/2003 | Itoyama et al. |
| 2003/0188527 | A1 | 10/2003 | Patterson et al. |
| 2003/0200745 | A1 | 10/2003 | van Nieuwstadt et al. |
| 2003/0200746 | A1 | 10/2003 | Saito et al. |
| 2003/0209010 | A1 | 11/2003 | Arnold |
| 2003/0213235 | A1 | 11/2003 | Kitahara et al. |
| 2003/0221421 | A1 | 12/2003 | Gui et al. |
| 2003/0221423 | A1 | 12/2003 | Kosaka et al. |
| 2003/0230060 | A1 | 12/2003 | Yahata et al. |
| 2003/0230076 | A1 | 12/2003 | Kwon |
| 2003/0230077 | A1 | 12/2003 | Kuboshima et al. |
| 2003/0230078 | A1 | 12/2003 | Yahata et al. |
| 2003/0230079 | A1 | 12/2003 | Kuboshima et al. |
| 2004/0000139 | A1 | 1/2004 | Kawashima et al. |
| 2004/0011030 | A1 | 1/2004 | Braun et al. |
| 2004/0020194 | A1 | 2/2004 | Nishimura et al. |
| 2004/0031262 | A1 | 2/2004 | Gui et al. |
| 2004/0055279 | A1 | 3/2004 | Plote et al. |
| 2004/0074225 | A1 | 4/2004 | Schaller et al. |
| 2004/0098977 | A1 | 5/2004 | Kupe et al. |
| 2004/0098979 | A1 | 5/2004 | Hammerle et al. |
| 2004/0103648 | A1 | 6/2004 | Opris et al. |
| 2004/0103654 | A1 | 6/2004 | Ohtake et al. |
| 2004/0134187 | A1 | 7/2004 | Inoue et al. |
| 2004/0139729 | A1 | 7/2004 | Taylor, III et al. |
| 2004/0139733 | A1 | 7/2004 | Koga et al. |
| 2004/0144069 | A1 | 7/2004 | Gabe et al. |
| 2004/0144083 | A1 | 7/2004 | Ament |
| 2004/0144087 | A1 | 7/2004 | Kondou et al. |
| 2004/0159097 | A1 | 8/2004 | Uematsu et al. |
| 2004/0172935 | A1 | 9/2004 | Otake et al. |

FOREIGN PATENT DOCUMENTS

| | | |
|---|---|---|
| EP | 1 431 549 A3 | 7/2005 |
| FR | 2 799 508 | 4/2001 |
| FR | 2 862 103 | 5/2005 |
| TW | 550333 B | 9/2003 |

* cited by examiner

METHOD AND SYSTEM FOR REGENERATION OF A PARTICULATE FILTER

BACKGROUND OF THE INVENTION

1. Field of the Invention

The present invention relates to systems and methods for controlling regeneration of a particulate filter by fuel delivery to an oxidation catalyst.

2. Background Art

A particulate filter is a device for capturing particulates emitted in exhaust gases from a combustion engine. In some systems employing a particulate filter, it may be desired to oxidize or burn the captured particulates in a process commonly referred to as regeneration. This is desirable to reduce the restriction of the particulate filter on the exhaust flow and thus maximize the engine fuel economy. The burning of the particulates is dependent on temperatures at the particulate filter. The high temperature needed to regenerate the particulate filter is typically achieved by vaporizing unburned fuel in the exhaust gas by means of a fuel doser and the resultant fuel/exhaust gas mixture then flows to an oxidation catalyst where it is burned to heat the exhaust gas. This process is influenced by exhaust gas fuel levels and/or exhaust gas temperatures.

Accordingly, a need exists to eliminate the doser and control exhaust gas fuel levels and/or exhaust gas temperatures at the oxidation catalyst so as to facilitate burning of particulates captured with the particulate filter.

SUMMARY OF THE INVENTION

One non-limiting aspect of the present invention relates to controlling a fuel injection mechanism to inject fuel in coordination with a valve mechanism that alters exhaust valve events so as to controllably discharge non-combusted fuel in exhaust gases emitted from an engine and to control the exhaust gas temperatures so as to control regeneration of a particulate filter. A controller may be configured to determine the amount of fuel to be included within the exhaust gases to facilitate regeneration of the particulate filter and to control the engine accordingly.

In accordance with one non-limiting aspect of the present invention, the valve mechanism for at least one cylinder may be configured to alter exhaust valve events near the end of the compression stroke so as to prevent combustion of the injected fuel and discharge of the uncombusted fuel with the exhaust gases near the end of the compression stroke. This alteration to the exhaust valve events also has an effect on exhaust gas temperature that influences the condensation of the vaporized unburned fuel as well as the amount of fuel necessary to heat the exhaust gas further by means of the oxidation catalyst. The controller may determine a desired exhaust gas temperature for regeneration and control the engine valve actuation mechanism and injection mechanism to emit exhaust gases at the desired exhaust gas temperature and with a desired amount of unburned fuel.

In accordance with one non-limiting aspect of the present invention, the controller must increase fueling by an appropriate amount to the remaining cylinders with normal valve events such that no change in engine speed or output (shaft) power occurs. In this manner, fuel emitted with the exhaust gases may be controlled and correlated with operations of the particulate filter so as to provide fuel to the oxidation catalyst and facilitate the regeneration thereof without consequence to the requested engine speed or power output.

The above features and advantages, along with other features and advantages of the present invention, are readily apparent from the following detailed description of the invention when taken in connection with the accompanying drawings.

DETAILED DESCRIPTION OF THE PREFERRED EMBODIMENT(S)

Figure 1:
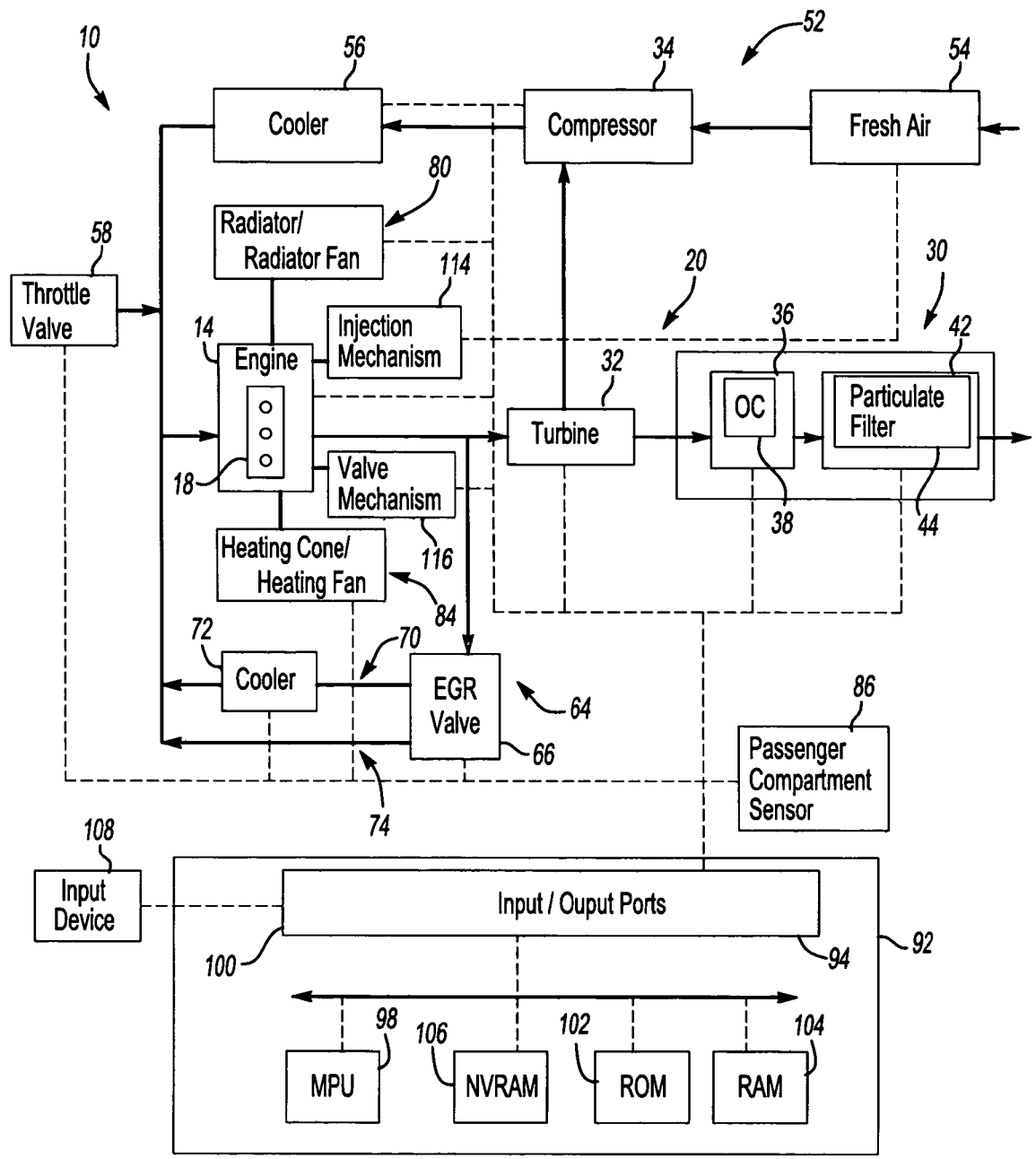
FIG. 1 illustrates a system in accordance with one non-limiting aspect of the present invention.

FIG. 1 illustrates a vehicle powertrain system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion driven system wherein fuels, such as gasoline and diesel fuels, are burned in a combustion process to provide power, such as with an spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbocompound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and burn the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions therebetween to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after being compressed by the compressor 34. Optionally, a throttle intake valve 58 may be provided to control the flow of fresh air to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an exhaust gas cooler 72, and an EGR non-cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features in various sequences along the EGR flow path and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for controlling the engine 14 temperature by controlling coolant flow and/or temperature therethrough. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The engine cooling system 80 may operate in conjunction with a vehicle heating system 84. The heating system 84 may include a heating cone, a heating fan, and a heater valve. The heating cone may receive heated coolant fluid from the engine 14 through the heater valve so that the heating fan, which may be electrically controllable by occupants in a passenger area or cab of a vehicle, may blow air warmed by the heating cone to the passengers. For example, the heating fan may be controllable at various speeds to control an amount of warmed air blown past the heating cone whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, intake, coolant, lubrication and air conditioning systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel injection for the cylinders 18. The injection mechanism 114 may be controlled by the controller 92 or other controller and comprise any number of features, including but not limited to features for pumping fuel into a common-rail that is fluidically connected to a unit that injects fuel into each cylinder individually at the desired time and quantity. The current invention anticipates the need for the injection mechanism 114 to separately and independently control the fuel injected into each cylinder such that each cylinder may be separately and independently controlled to receive varying amounts of fuel at appropriate times or no fuel at all. Of course, the present invention contemplates that the injection mechanism 114 may include more or less of these features and is not intended to be limited to the features described above.

The system 10 may include a valve mechanism 116 for controlling valve events of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may include a compression brake mechanism that controls the exhaust valve timing of one or more cylinders such that the exhaust valves may be opened during the compression stroke as well as the normal exhaust stroke and thus be capable of controlling exhaust temperature according the method of this invention. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control engine fueling as well as any feature in the system 10. Moreover, the present invention contemplates that the system may include more than one controller, such as separate controllers for controlling system or sub-systems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature, such as regeneration system controller, may be configured for controlling regeneration of the particulate filter 44 whereby particulates captured by the particulate filter 44 are oxidized or otherwise burned. The disposal of the particulates in this manner may be advantageous to prevent clogging and filling of the particulate filter so that exhaust gases may pass therethrough with minimal restriction and yet permit additional particulates to be collected.

In accordance with one non-limiting aspect of the present invention, the regeneration may be controlled by means of the fuel quantity emitted with the exhaust gases and/or the temperature of the exhaust gases. In more detail, one non-limiting aspect of the present invention contemplates controlling fuel emitted in the exhaust gases from the engine 14 to facilitate regeneration of the particulate filter 44. Furthermore, one non-limiting aspect of the present invention contemplates controlling the temperatures of the exhaust gases emitted from the engine so as to further control the combustion of the fuel and regeneration of the particulate filter 44.

For example, to facilitate oxidizing the captured particulates, the present invention contemplates controlling the system 10 so that non-combusted fuel may be emitted from the engine 14 and introduces to the exhaust gases such that the fuel reacts with oxygen, facilitated by the catalyst in the OC 38, to combust and increase temperatures at the particulate filter 44, such as to facilitate regeneration. The amount of fuel injected may be controlled as a function of temperatures at the particulate filter 44 and other system parameters, such as air mass flow, EGR temperatures, and the like, so as to control regeneration. One non-limiting aspect of the present invention is control of the fuel included within the exhaust gases to the oxidation catalyst 38 through measures that eliminate the doser 50 and it's complexities.

One non-limiting aspect of the present invention contemplates determining parameters or conditions associated with desired regeneration and controlling the fuel emitted from the engine and/or exhaust gas temperatures as a function thereof. For example, the controller 92 or other feature in the system may be configured for determining an amount of fuel to be carried within the exhaust gases in order to control the exhaust gas temperature out of the OC 38. The amount of fuel and its timing as it is delivered to one or more of the cylinders with altered exhaust valve events may be determined in any manner and based on any number of parameters, including, for example, operating and material characteristics of the particulate filter, soot burn rates during regeneration, exhaust gas temperatures, and the like. Likewise, the controller 92 or other feature may be further configured to determine a desired exhaust gas temperatures to facilitate regeneration, which may be determined, for example, as a function of the number of cylinders with altered exhaust valve events during the compression stroke or other parameters, such as those described above.

In accordance with one non-limiting aspect of the present invention, the engine 14 may be controlled to emit non-combusted fuel with the exhaust gases in order to facilitate regeneration such that other features in the system for introducing fuel to the exhaust gases downstream of the engine 14 may be eliminated, like a doser. For example, the present invention contemplates altering the exhaust valve events of one or more cylinders 18 during the compression stroke to initiate cylinder blowdown and thereafter control fuel injection timing of one or more of the cylinders 18 to control the emission of non-combusted fuel therefrom. In more detail, the valve mechanism 116 may open one or more exhaust valves near the end of the compression stroke to minimize cylinder volume and thereafter control the injection mechanism 114 so as to inject fuel while cylinder conditions are below auto ignition conditions such that the fuel fails to combust and is emitted from the cylinder with the opening of the exhaust valve and movement of the piston.

The present invention contemplates controlling fuel injection based on any number of variables and features. In particular, the present invention contemplates not only controlling timing of the fuel injection, but also the quantity, pressure, and frequency of injection. As such, the present invention contemplates determining any number of variables associated with auto-ignition conditions, such as a cylinder pressure, temperature, exhaust valve opening timing, air and fuel mass volumes, and the like, and controlling injection accordingly so that non-combusted fuel is emitted with the exhaust gases from the engine. Moreover, the present invention contemplates controlling any number of cylinders to emit fuel in various quantities including no-fueling as a function of the desired amount of fuel delivered in the exhaust stream to the oxidation catalyst 38 and other parameters affecting regeneration.

One non-limiting aspect of the present invention relates to controlling exhaust gas temperatures of the exhaust gases emitted from the engine 14 in combination with the foregoing control of non-combusted fuel emitted from the engine in order to further facilitate fuel delivery and fuel minimization for regeneration of the particulate filter. In more detail, the present invention contemplates controlling the valve mechanism 116 to alter the exhaust valve opening during the compression stroke for one or more unfueled cylinders in order to control the exhaust gases temperatures of the exhaust gases emitted therefrom, such as by controlling the fuel injector mechanism 114 to stop fueling to one or more these cylinders. This use of one or more unfueled cylinders in this manner forces the fueled cylinders to make up for the loss of power associated with the unfueled cylinders if current engine operation is to be maintained, thereby increasing load on the engine and advantageously the exhaust gas temperatures emitted therefrom.

As described above, the present invention is not intended to be limited to only controlling fuel injection timing, frequency, pressure, and quantity to control the amount of fuel emitted with the exhaust gases and carried therein to the oxidation catalyst 38 to facilitate the regeneration of the particulate filter 44 thereof. Rather, the present invention contemplates integrating the control of fuel emission with exhaust valve control and other operating conditions, such as the aforementioned control of exhaust gas temperatures, and in addition to other parameters, such as an engine speed and idle rates, as well as modulating between one or more of these control features.

To compensate for the loss of power from cylinders with exhaust valve opening near the end of the compression stroke whether fueled or not, fuel quantity and/or timing for the remaining cylinders with normal valve events must be increased appropriately such that the requested engine speed or output power is not affected.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for regenerating a particulate filter by controlling fuel delivery to a oxidation catalyst, the oxidation catalyst and particulate filter being in gaseous communication with a four-stroke internal combustion engine having a number of cylinders for internal combustion which emit exhaust gases, the method comprising:
   determining an amount of fuel to be included within the exhaust gases such that a desired temperature of said exhaust gases may be achieved out of the oxidation catalyst to facilitate regeneration;
   emitting fuel from the engine as a function of the determined amount of fuel so as to facilitate regeneration of the particulate filter without requiring use of a fuel injection device downstream of the engine;
   controlling valve timing in order to control an amount of fuel emitted from the engine to the particulate filter, wherein controlling the valve timing includes controlling opening or closing of at least one of an intake valve or exhaust valve such that a positioning of the at least one controlled valve is not fixed during all four strokes of the four-stroke engine;
   determining a desired exhaust gas temperature for gases emitted from the engine to facilitate regeneration, and emitting exhaust gases from the engine at the desired exhaust gas temperature by operating the engine with at least one unfueled cylinder; and
   wherein regeneration of the particulate filter is required when the engine is operating at idle speed, and wherein emitting exhaust gases from the engine at the desired exhaust gas temperature includes operating the engine at an increased idle speed and with at least one unfueled cylinder and one or more cylinders having fuel injected below the auto ignition temperature and pressure.

2. The method of claim 1 further comprising determining a the number of cylinders with altered exhaust valve events as a function of the desired exhaust gas temperature.

3. The method of claim 1 further comprising increasing at least one of injected fuel quantity and changing injection timing for cylinders with unmodified exhaust events to maintain at least one of a requested engine speed and output power.

4. The method of claim 1 wherein the fuel is emitted by controlling fuel injection quantity and timing of one or more of the cylinders and altering exhaust valve events of said cylinders so as to control fuel emitted from said cylinders independently of the remaining cylinders.

5. The method of claim 4 further comprising controlling the fuel injection timing such that fuel is injected while cylinder conditions are below auto ignition conditions so that the non-combusted fuel is emitted from the engine with the exhaust gases.

6. The method of claim 5 further comprising determining the auto ignition condition as a function of at least one of cylinder pressure and temperature.

7. The method of claim 4 further comprising opening one or more exhaust valves during the compression stroke of the one or more cylinders such that fuel is injected below the auto ignition conditions and at least a portion of the injected fuel is emitted from the said cylinders without combusting.

8. The method of claim 4 further comprising selecting a number of cylinders having fuel injected below the auto ignition conditions as a function of the determined amount of fuel.

9. The method of claim 8 further comprising at least one of controlling the quantity and timing of fuel injection as a function of the determined amount of fuel and exhaust gas temperature out of the oxidation catalyst.

10. The method of claim 8 further comprising determining the predefined temperature range as function of soot burn rates of the particulate filter.

11. A method for regenerating a particulate filter by controlling fuel delivery to a oxidation catalyst, the oxidation catalyst and particulate filter being in gaseous communication with an internal combustion engine having a number of cylinders for internal combustion which emit exhaust gases, the method comprising:
    determining an amount of fuel to be included within the exhaust gases such that a desired temperature of said exhaust gases may be achieved out of the oxidation catalyst to facilitate regeneration;
    emitting fuel from the engine as a function of the determined amount of fuel so as to facilitate regeneration of the particulate filter without requiring use of a fuel injection device downstream of the engine;
    determining a desired exhaust gas temperature for gases emitted from the engine to facilitate regeneration, and emitting exhaust gases from the engine at the desired exhaust gas temperature by operating the engine with at least one unfueled cylinder; and wherein regeneration of the particulate filter is required when the engine is operating at idle speed, and wherein emitting exhaust gases from the engine at the desired exhaust gas temperature includes operating the engine at an increased idle speed and with at least one unfueled cylinder and one or more cylinders having fuel injected below the auto ignition temperature and pressure.

* * * * *